United States Patent
Mugan et al.

(10) Patent No.: US 12,126,115 B2
(45) Date of Patent: Oct. 22, 2024

(54) ROTATABLE ELECTRICAL RECEPTACLE FOR LUMINAIRE

(71) Applicant: Amphenol Corporation, Wallingford, CT (US)

(72) Inventors: Shan Mugan, Markham (CA); Adrian Green, Newcastle (CA)

(73) Assignee: AMPHENOL CORPORATION, Wallingford, CT (US)

( * ) Notice: Subject to any disclaimer, the term of this patent is extended or adjusted under 35 U.S.C. 154(b) by 113 days.

(21) Appl. No.: 17/619,149

(22) PCT Filed: Jun. 3, 2021

(86) PCT No.: PCT/US2021/035716
§ 371 (c)(1),
(2) Date: Dec. 14, 2021

(87) PCT Pub. No.: WO2021/247873
PCT Pub. Date: Dec. 9, 2021

(65) Prior Publication Data
US 2022/0299199 A1      Sep. 22, 2022

Related U.S. Application Data

(60) Provisional application No. 63/034,472, filed on Jun. 4, 2020.

(51) Int. Cl.
*H01R 13/627* (2006.01)
*F21V 17/02* (2006.01)
(Continued)

(52) U.S. Cl.
CPC ......... *H01R 13/6271* (2013.01); *F21V 17/02* (2013.01); *F21V 23/0464* (2013.01);
(Continued)

(58) Field of Classification Search
CPC . H01R 13/6271; H01R 13/5202; F21V 17/02; F21V 23/0464; F21V 23/06; F21V 23/0442; F21S 8/085; F21W 2131/103
See application file for complete search history.

(56) References Cited

U.S. PATENT DOCUMENTS 4,477,143 A    10/1984  Taylor
4,653,834 A     3/1987  Norden
(Continued)

FOREIGN PATENT DOCUMENTS

GB      2 524 095 A      9/2015
WO   WO 2020/099393 A1   5/2020

OTHER PUBLICATIONS

International Search Report; International Application No. PCT/US2021/035716; International Filing Date Jun. 3, 2021; Date of Mailing Aug. 27, 2021; 4 Pages.
(Continued)

*Primary Examiner* — Georgia Y Epps
*Assistant Examiner* — Don J Williams
(74) *Attorney, Agent, or Firm* — CANTOR COLBURN LLP

(57) ABSTRACT

A rotatable receptacle and method of assembling and mounting a rotatable receptacle. The receptacle includes an outer ring that has a mounting surface for mounting to a housing, and a rotatable insert that is received in the outer ring. An inner surface of the outer ring surrounds an outer surface of the rotatable insert. The rotatable insert has an electrical face configured to mate with a photoelectric device and an opposite mounting face for mounting to the housing. The rotatable insert is rotatable with respect to the outer ring to orient the rotatable insert in a desired direction for optimal positioning of the photoelectric device. The outer ring and
(Continued)

the rotatable insert have corresponding interlocking features configured to fix the rotatable insert in the desired direction.

28 Claims, 13 Drawing Sheets

(51) Int. Cl.
    *F21V 23/04*     (2006.01)
    *F21V 23/06*     (2006.01)
    *H01R 13/52*     (2006.01)
    *F21S 8/08*     (2006.01)
    *F21W 131/103*     (2006.01)

(52) U.S. Cl.
    CPC ......... *F21V 23/06* (2013.01); *H01R 13/5202* (2013.01); *F21S 8/085* (2013.01); *F21V 23/0442* (2013.01); *F21W 2131/103* (2013.01)

(56) References Cited

U.S. PATENT DOCUMENTS

| | | | |
|---|---|---|---|
| 7,637,766 B2 | 12/2009 | Kauffman et al. | |
| 8,038,481 B1 | 10/2011 | Creighton et al. | |
| 8,398,435 B2 | 3/2013 | Aurongzeb et al. | |
| 9,077,112 B2 | 7/2015 | Mitchell et al. | |
| 9,347,822 B2 | 5/2016 | Mostoller et al. | |
| 9,638,405 B2 | 5/2017 | Hobson | |
| 9,651,420 B2 | 5/2017 | Weber | |
| 9,691,582 B2 | 6/2017 | Ye | |
| 9,974,143 B2 | 5/2018 | Stuby, Jr. | |
| 10,175,104 B2 | 1/2019 | Howard | |
| 10,330,301 B1 * | 6/2019 | Howard | F21V 23/06 |
| 2007/0001113 A1 | 1/2007 | Langlois | |
| 2009/0088021 A1 | 4/2009 | Kauffman et al. | |
| 2013/0210252 A1 | 8/2013 | Ilyes | |
| 2015/0260377 A1 | 9/2015 | Hobson | |
| 2015/0323380 A1 | 11/2015 | Mostoller et al. | |
| 2016/0111813 A1 | 4/2016 | Ye | |
| 2016/0312984 A1 | 10/2016 | Poorter et al. | |
| 2019/0162400 A1 | 5/2019 | Mostoller et al. | |
| 2021/0384669 A1 | 12/2021 | Mugan et al. | |

OTHER PUBLICATIONS

Written Opinion; International Application No. PCT/US2021/035716; International Filing Date Jun. 3, 2021; Date of Mailing Aug. 27, 2021; 7 pages.

* cited by examiner

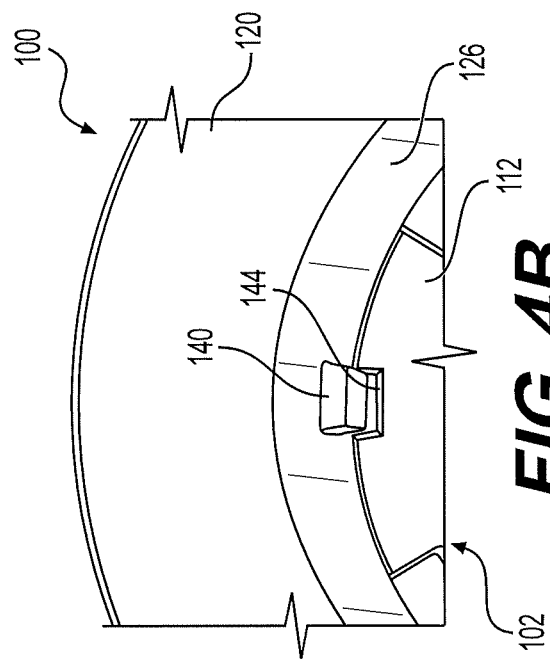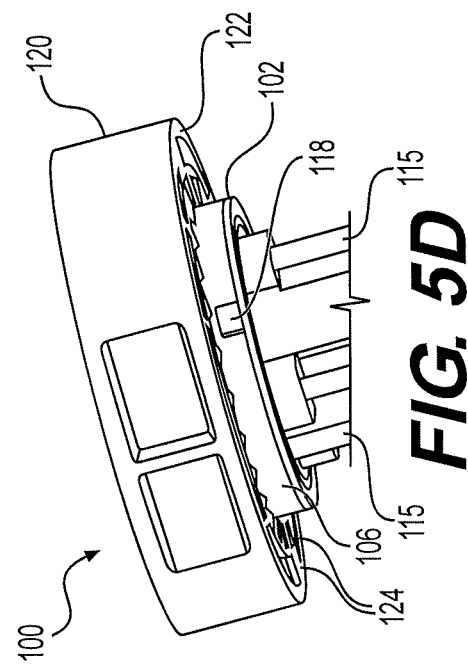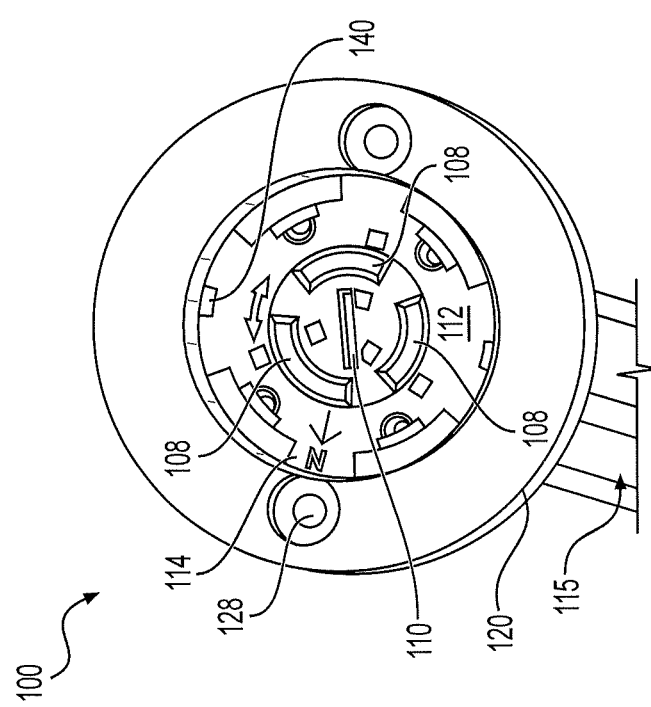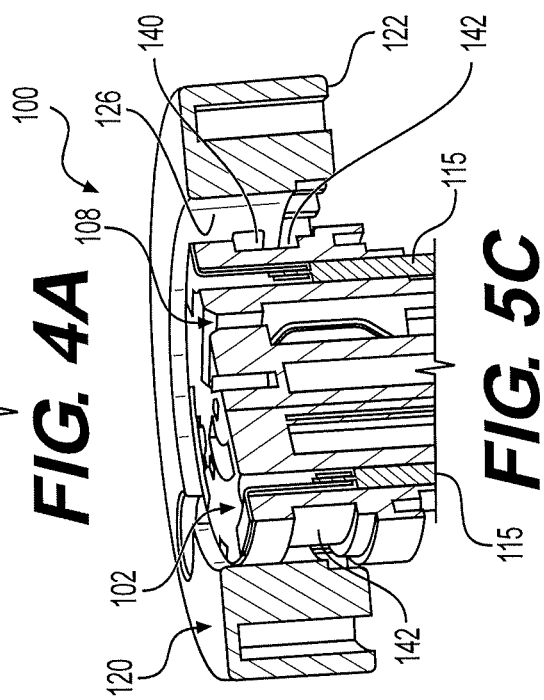

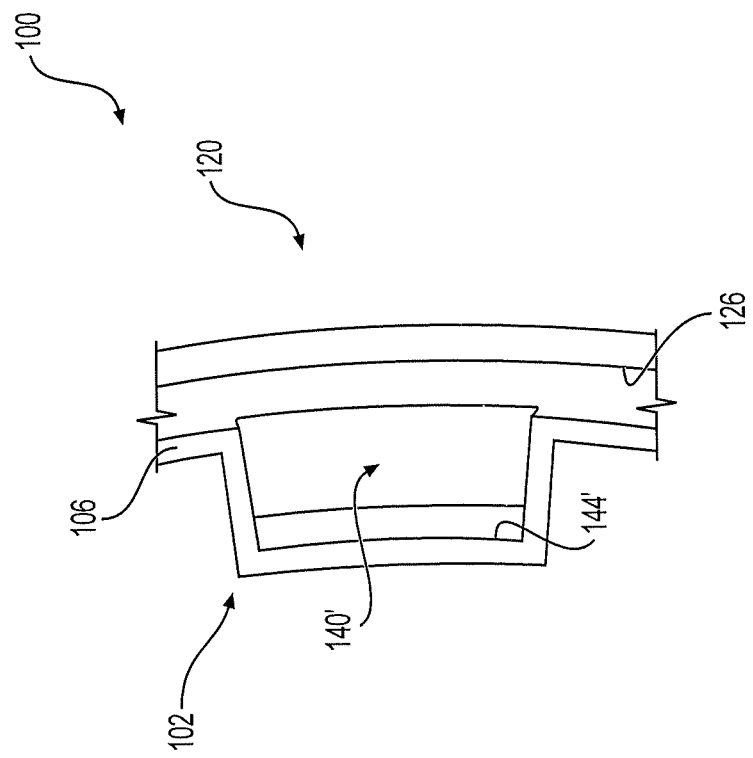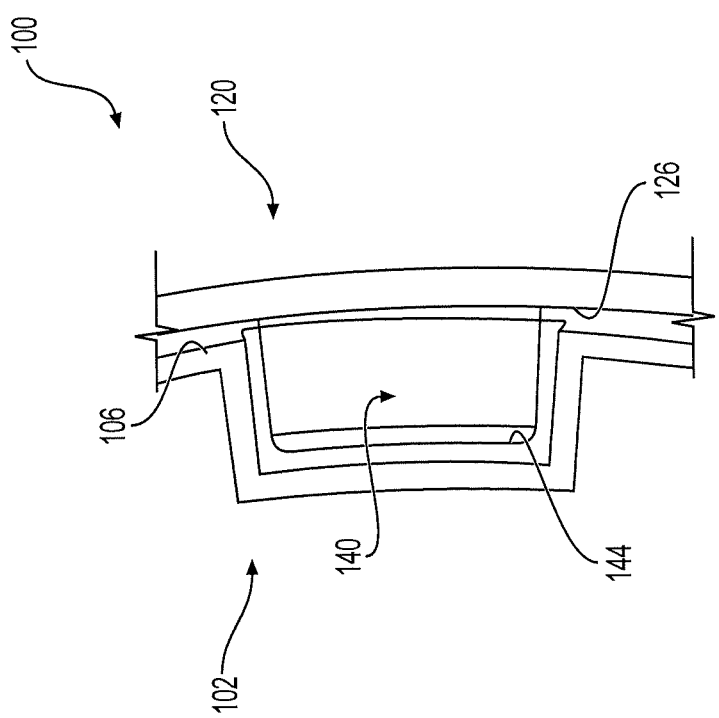

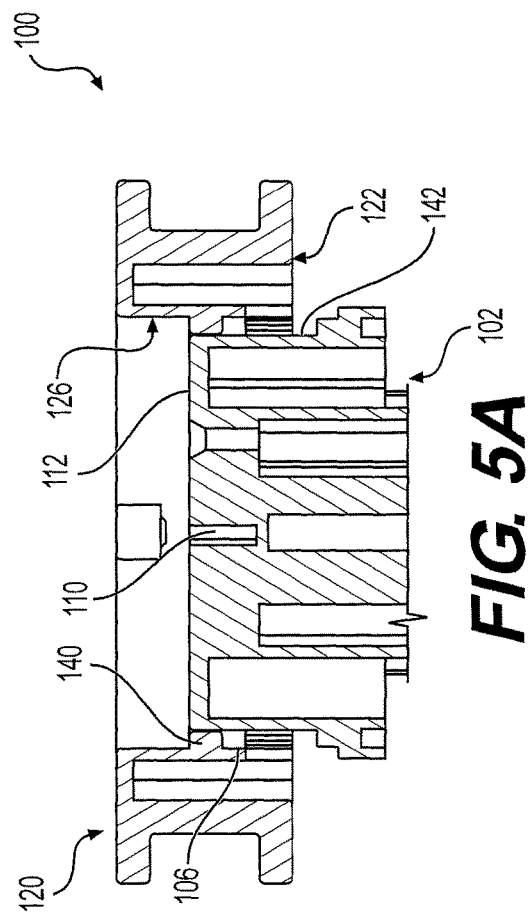
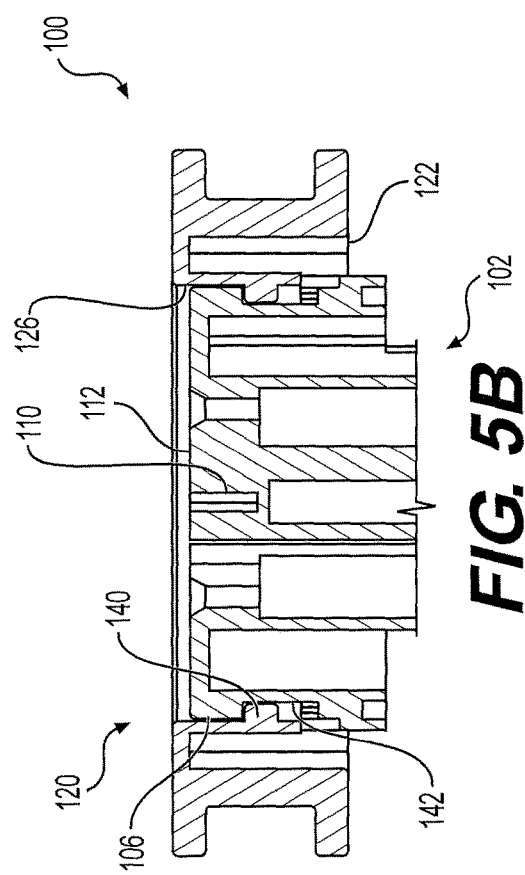

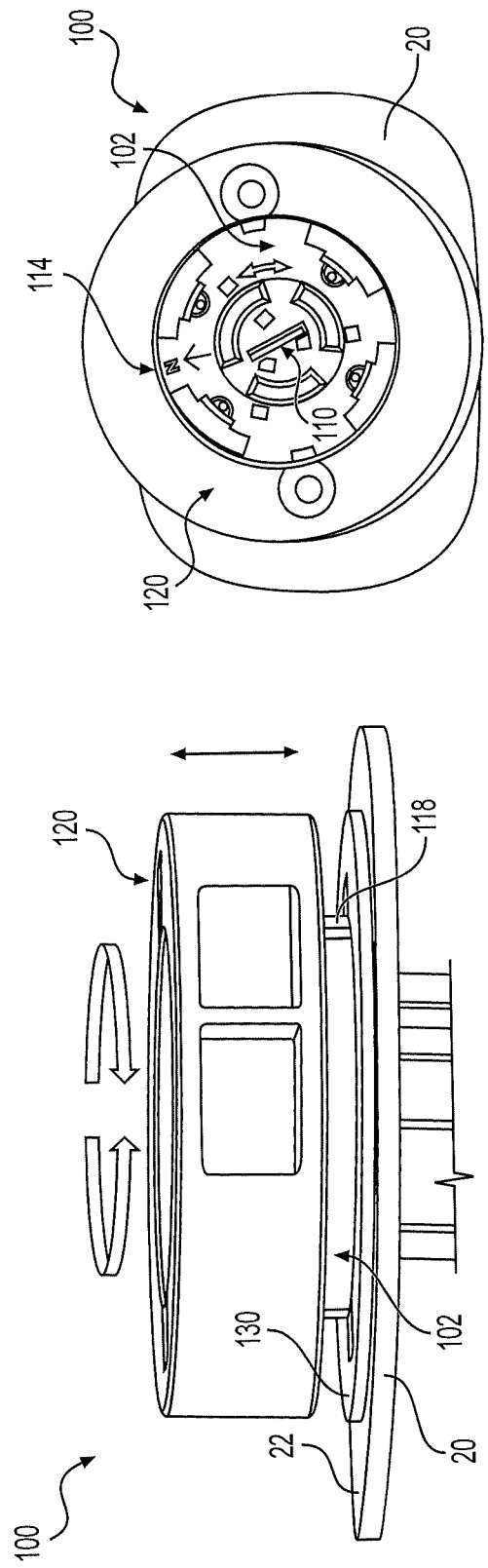
FIG. 6A
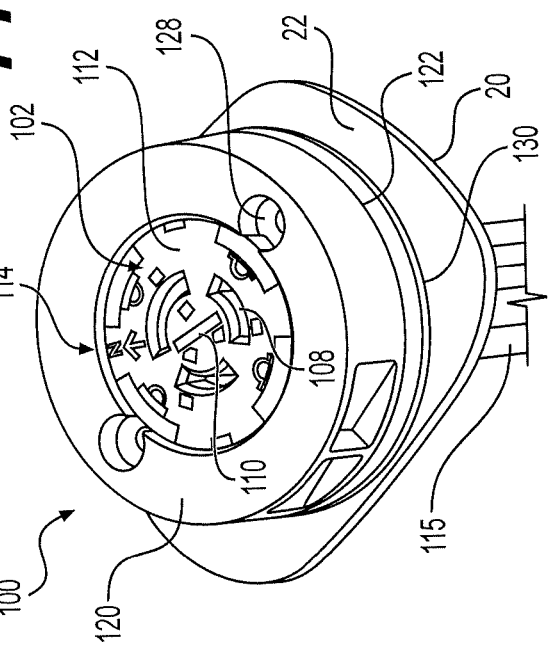
FIG. 6B
FIG. 6C

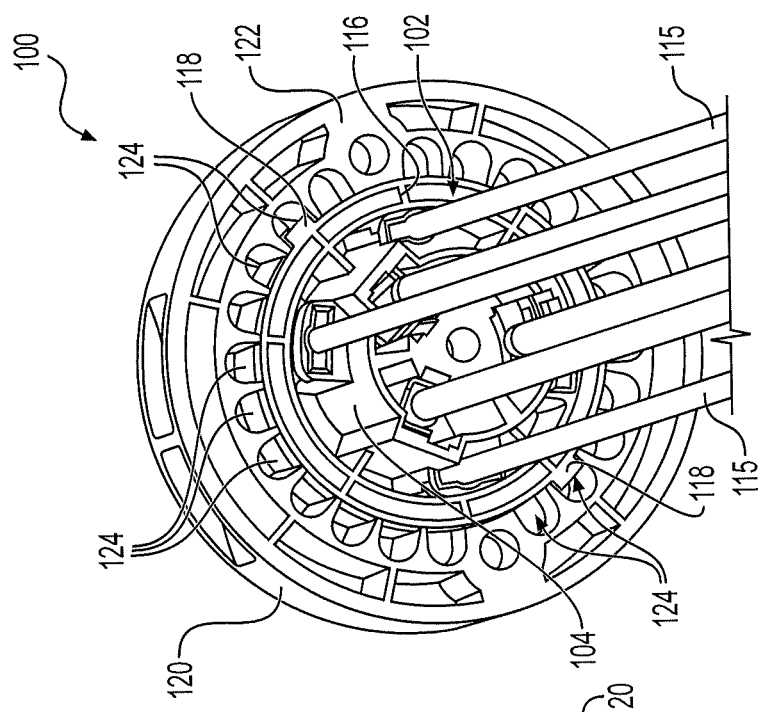
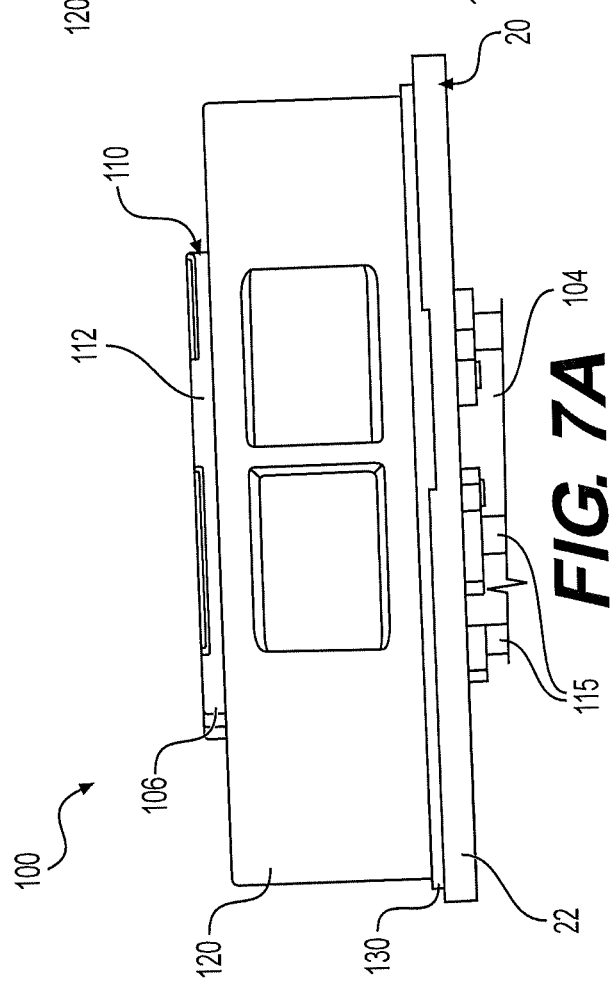

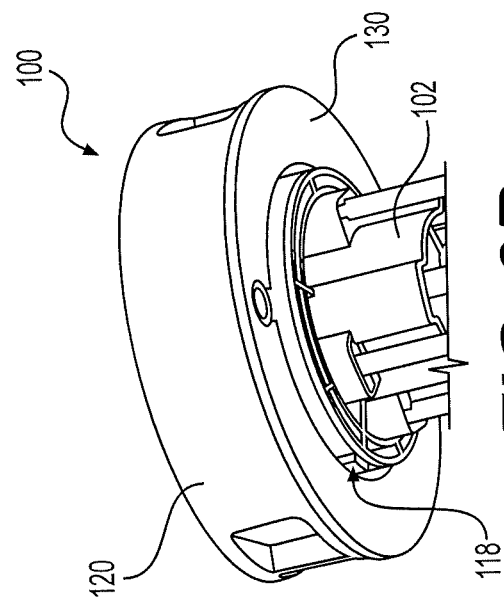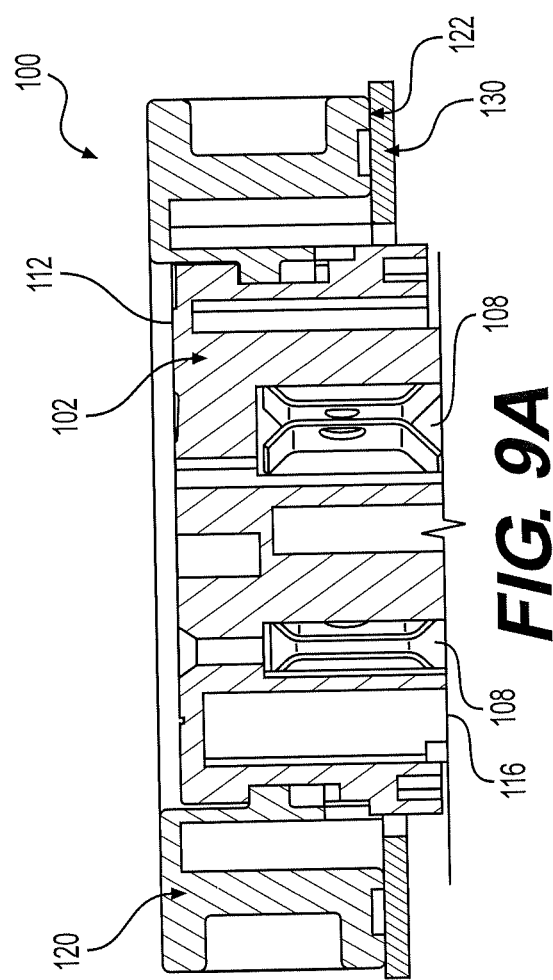

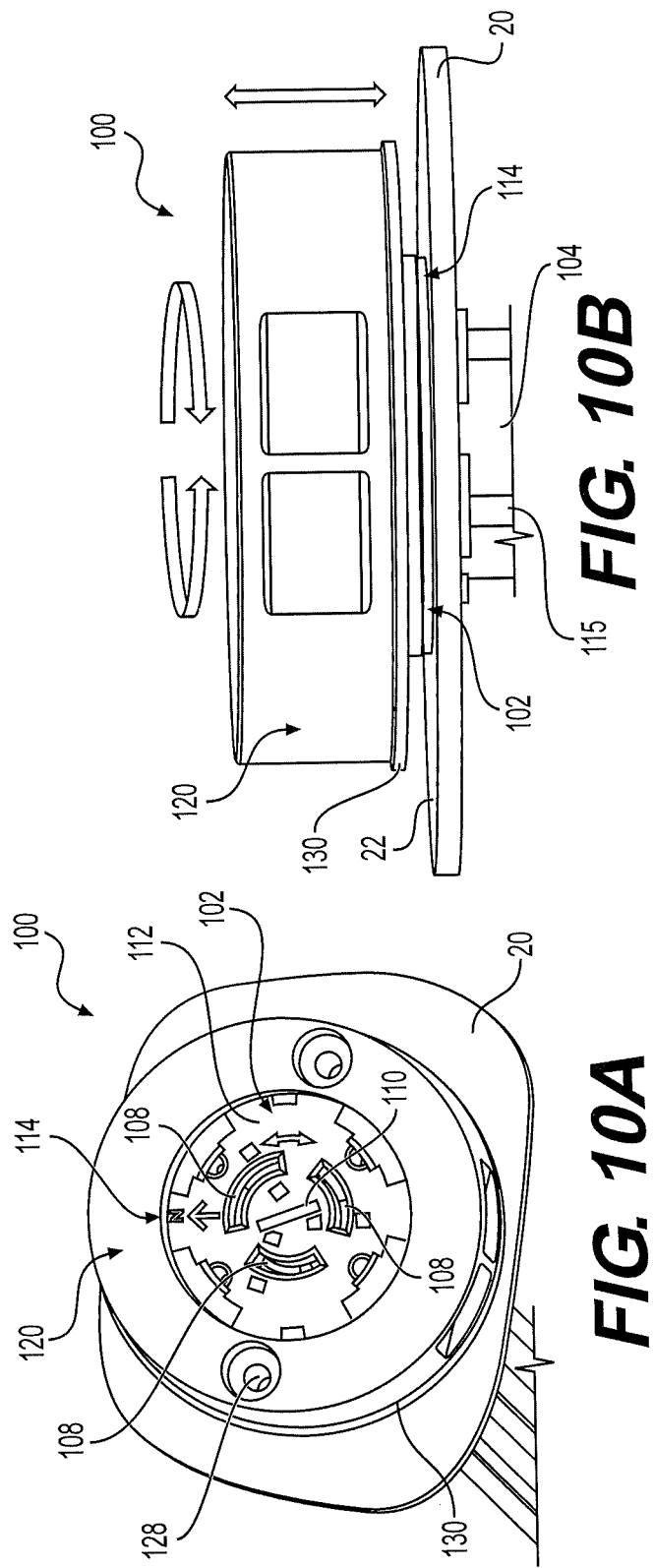

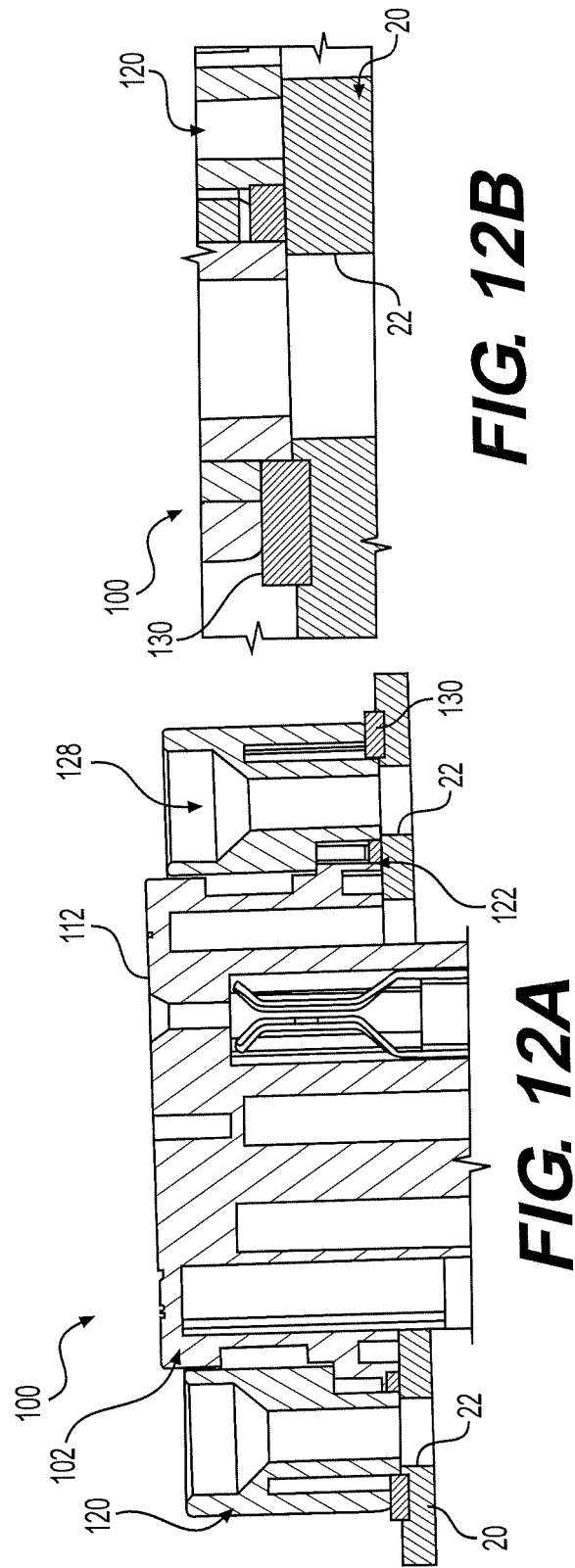

ROTATABLE ELECTRICAL RECEPTACLE FOR LUMINAIRE

RELATED APPLICATIONS

This application claims the benefit of and priority to International PCT Application No. PCT/US21/35716, filed Jun. 3, 2021, entitled Rotatable Electrical Receptacle for Luminaire, which claims the benefit of and priority to U.S. Provisional Application Ser. No. 63/034,472, filed on Jun. 4, 2020, entitled Rotatable Dimming Receptacle For Luminaire, the content of each of which is relied upon and incorporated herein by reference in its entirety.

BACKGROUND

The present disclosure relates to rotatable electrical receptacles used with luminaires, such as street lighting.

Photoelectric devices, such as controllers, sensors, or photocells, are commonly used to automatically control luminaires, for example, by dimming them or turning them off at dawn and on at dusk and. These luminaires are typically used to light roadways, streets, parking lots and other large outdoor areas. The photoelectrical device is attached to the luminaire by a receptacle. These photoelectric devices sense the intensity of the ambient light from the sun (or other light sources) and may turn the luminaires on and off accordingly. These luminaires can be dimmed to variable levels depending on sensor input. The photoelectric device of the luminaire could also look for motion (traffic, or pedestrian presence), and/or ambient light levels, to control how much additional light is needed by the luminaire. It is common to point the photocell light sensor of the photoelectric device generally in the North direction to optimize efficiency of the photocell.

SUMMARY

The present disclosure relates to a rotatable receptacle that comprises an outer ring that has a mounting surface for mounting to a housing and a rotatable insert that is received in the outer ring such that an inner surface of the outer ring surrounds an outer surface of the rotatable insert. The rotatable insert has an electrical face configured to mate with a photoelectric device and an opposite mounting face for mounting to the housing. The rotatable insert is rotatable with respect to the outer ring to orient the rotatable insert in a desired direction for optimal positioning of the photoelectric device. The outer ring and the rotatable insert have corresponding interlocking features configured to fix the rotatable insert in the desired direction.

In certain examples, the interlocking feature of the outer ring includes one or more locating holes formed in the mounting surface of the outer ring, and the interlocking feature of the rotatable insert includes at least one locating key on the outer surface of the rotatable insert sized to engage one of the locating holes of the outer ring; the locating holes are arranged annularly and spaced apart on the outer ring; the locating holes are arranged at intervals that are about 15 degrees apart; the rotatable insert and the outer ring are rotatably engaged with one another via corresponding engagement features, the engagement features include an annular groove and an alignment key receivable in the annular groove; the electrical face of the rotatable insert includes indicia that indicates the desired direction for optimal positioning of the photoelectric device; the indicia is the letter N or the word North; and/or a gasket is provided at the mounting surface of the outer ring.

The present disclosure may also relate to a rotatable receptacle that comprises an outer ring that has a mounting surface for mounting to a housing and a rotatable insert that is received in the outer ring such that an inner surface of the outer ring surrounds an outer surface of the rotatable insert. The rotatable insert has an electrical face configured to mate with a photoelectric device and an opposite mounting face for mounting to the housing. The rotatable insert is rotatable with respect to the outer ring to orient the rotatable insert in a desired direction for optimal positioning of the photoelectric device. The outer ring and the rotatable insert have corresponding engagement features that allow the rotatable insert to rotate with respect to the outer ring. The outer ring and the rotatable insert have corresponding interlocking features configured to fix the rotatable insert in the desired direction.

In some examples, the rotatable engagement feature of the rotatable insert is an annular groove formed in the outer surface of the rotatable insert; the rotatable engagement feature of the outer ring is an inwardly extending alignment key on the inner surface of the outer ring that is receivable in the annular groove of the rotatable insert; the annular groove of the rotatable insert includes at least one key entrance that is open at the electrical face of the rotatable insert and sized to receive the alignment key of the outer ring; the interlocking feature of the outer ring includes one or more locating holes formed in the mounting surface of the outer ring, and the interlocking feature of the rotatable insert includes at least one locating key on the outer surface of the rotatable insert sized to engage one of the locating holes of the outer ring; the electrical face of the rotatable insert includes direction indicia; the outer ring includes at least one bore for receiving a fastener for securing the outer ring to the housing; and/or a gasket is provided between the outer ring and the housing of the luminaire.

The present disclosure may further relate to a method of mounting a photoelectric receptacle to a luminaire. The photoelectric receptacle includes an outer ring and a rotatable insert with an electrical face configured to mate with a photoelectric device. The method comprises the steps of coupling the outer ring with the rotatable insert such that the rotatable insert freely rotates with respect to the outer ring and such that the outer ring and the rotatable insert are axially movable with respect to one another; after rotatably coupling the outer ring and the rotatable insert, rotating the rotatable insert to orient the rotatable insert in a desired direction for optimal positioning of the photoelectric device; and after orienting the rotatable insert, interlocking the outer ring and the rotatable insert to fix the rotatable insert in place in the desired direction.

In an example, the method further comprises the step of aligning the outer ring with respect to the rotatable insert before rotatably coupling the outer ring with the rotatable insert.

In other examples of the method, the step of aligning the outer ring with respect to the rotatable insert includes aligning an alignment key of the outer ring with a key entrance of the rotatable insert and pressing the outer ring to move the outer ring axially with respect to the rotatable insert to engage the alignment key with the key entrance; the alignment key and the key entrance are engaged in a clearance fit; the alignment key and the key entrance are engaged in an interference fit; the step of rotatably coupling the outer ring with the rotatable insert includes engaging an alignment key on the inner surface of the outer ring with an annular groove on the outer surface of the rotatable insert; and/or the step of orienting the rotatable insert includes rotating the rotatable insert intervals of about 15 degrees; the step of interlocking the outer ring and the rotatable insert includes fitting at least one locating key on an outer surface of the rotatable insert with one of a plurality of locating holes on the outer ring; and/or the locating key is exposed prior to the step of interlocking the outer ring with the rotatable insert.

In other examples, the method further comprises the step of mounting the interlocked outer ring and rotatable insert to the housing and securing the outer ring to the housing; further comprises the step of placing a gasket on the housing prior to mounting the interlocked outer ring and rotatable insert to the housing and compressing the gasket between the outer ring and the housing; and/or further comprises the step of placing a gasket on a mounting surface of the outer ring prior to mounting the interlocked outer ring and rotatable insert to the housing and compressing the gasket between the outer ring and the housing.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIGS. 4A and 4B are perspective and enlarged partial views, respectively, of an outer ring and the insert of the receptacle of FIG. 1, showing an aligning step in assembling and mounting the receptacle;

FIGS. 4C and 4D are enlarged partial views of the outer ring and the insert of the receptacle illustrated in FIGS. 4A and 4B, showing alternative ways of coupling the outer ring and the insert;

FIGS. 5A-5D are various cross-sectional and perspective views of the receptacle of FIG. 1, showing a coupling step in assembling and mounting the receptacle;

FIGS. 6A-6C are various view of the receptacle of FIG. 1, showing a rotating and orienting step in assembling and mounting the receptacle;

FIG. 7A is an elevational view of the receptacle illustrated in FIG. 1, showing the receptacle assembled and mounted to the housing of a luminaire;

FIG. 7B is a bottom perspective view of the receptacle illustrated in FIG. 7A with the housing;

FIGS. 9A and 9B are cross-sectional and bottom perspective views, respectively, of the receptacle illustrated in FIG. 8;

FIGS. 10A and 10B are top perspective and elevational views, respectively, of the receptacle illustrated in FIG. 8, showing the rotating and orienting step in assembling and mounting the receptacle of FIG. 8;

FIGS. 12A and 12B are partial cross-sectional views of the receptacle illustrated in FIG. 11A.

DETAILED DESCRIPTION

The present disclosure relates to rotatable electrical receptacles and methods for assembling and mounting the same to a luminaire or the like. The rotatable receptacles can be used to mount a photoelectric device onto the luminaire or the like. The rotatable nature of the receptacle facilitates positioning of the photocell or photosensor of the photoelectric device on the luminaire for optimization of the photocell efficiency of the photoelectric device. In an example, the rotatable receptacle comprises an outer ring that has a mounting surface for mounting to a housing; a rotatable insert that is received in the outer ring such that an inner surface of the outer ring surrounds an outer surface of the rotatable insert, and the rotatable insert has an electrical face configured to mate with a photoelectric device and an opposite mounting face for mounting to the housing. The outer ring and the rotatable insert have corresponding interlocking features configured to orient the rotatable insert on the housing in a desired direction for optimal positioning of the photoelectric device for optimal photocell efficiency and operation.

Referring to the figures, the present disclosure relates to a rotatable electrical receptacle 100, such as those configured to mount to a luminaire 20 or the like, and mate with a photoelectric device 10 associated with the luminaire 20, such as a dimming street lighting, for example.

Figure 1:
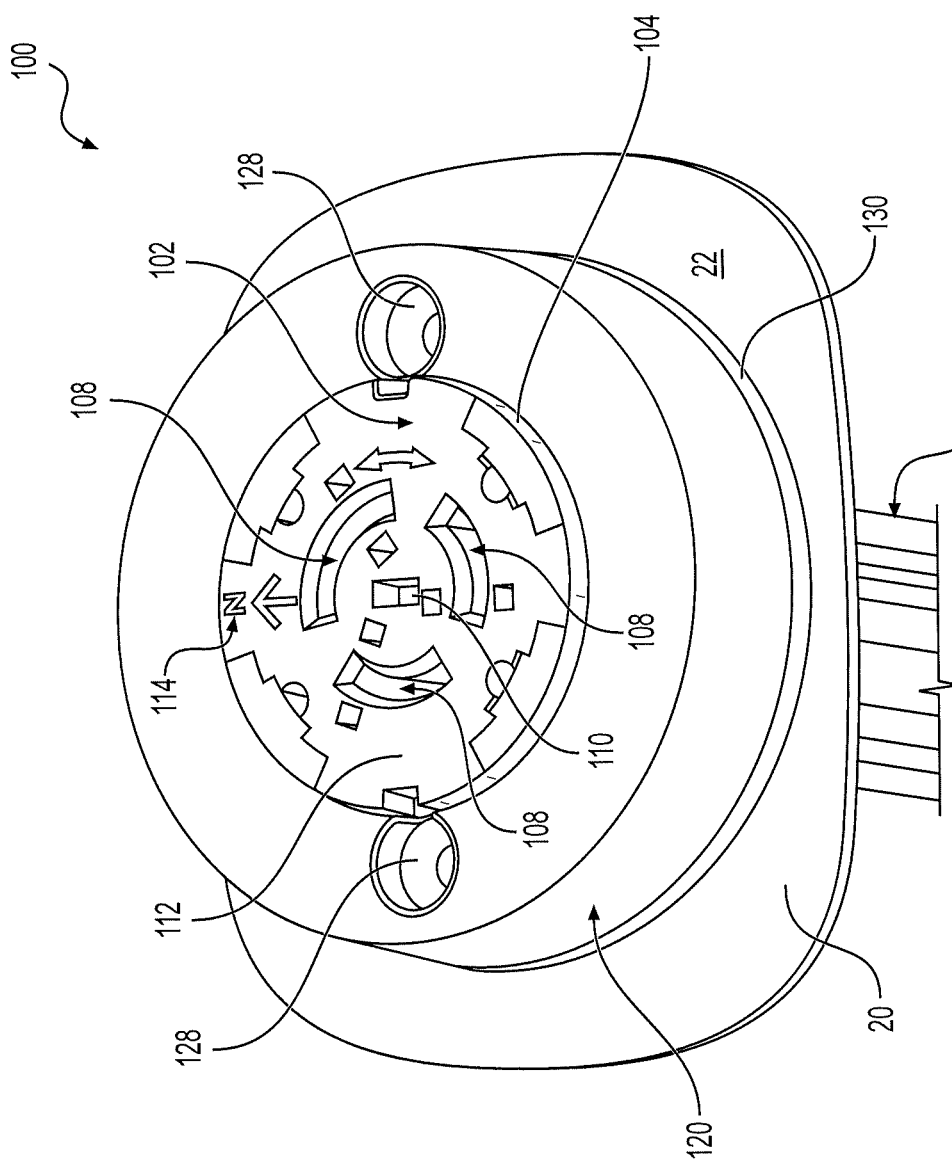
FIG. 1 is a perspective view of a rotatable receptacle, according to an example of the present disclosure, showing the receptacle mounted to a housing of a luminaire.
Figure 2:
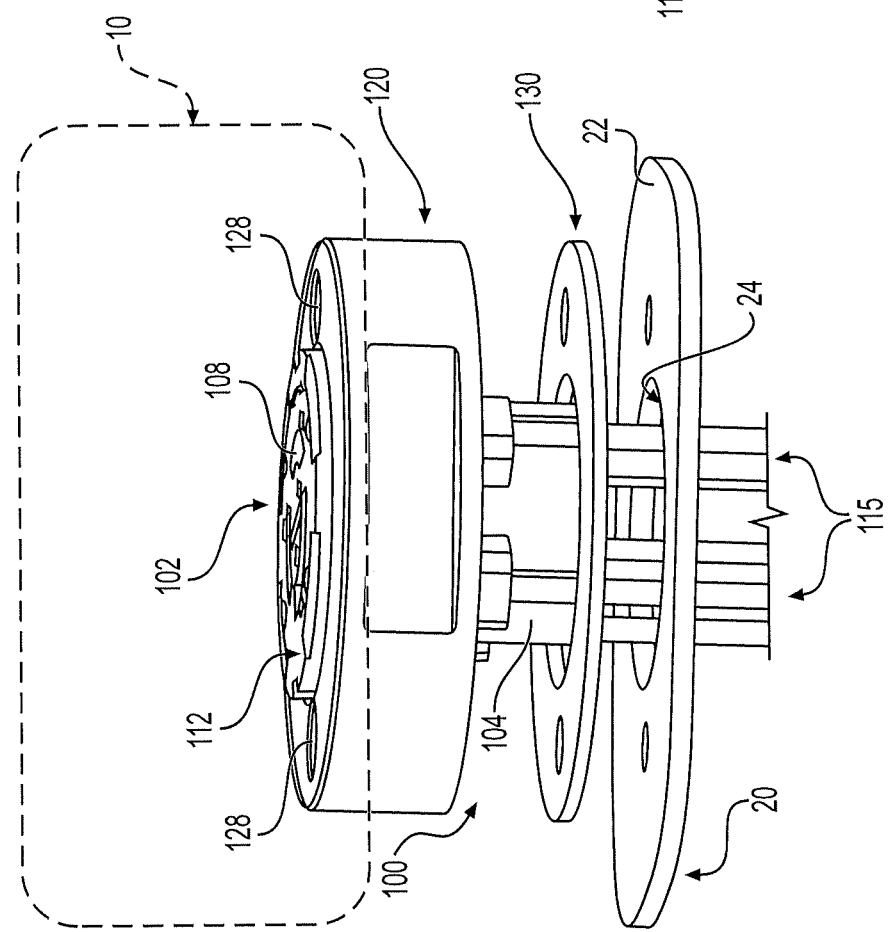
FIG. 2 is an exploded view of the receptacle of FIG. 1.
Figure 3:
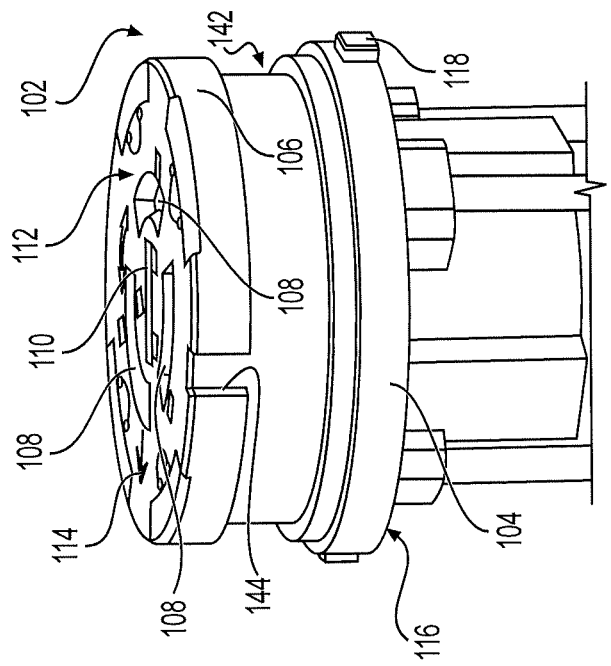
FIG. 3 is a perspective view of an insert of the receptacle of FIG. 1.

In one example, shown in FIGS. 1-3, the receptacle 100 generally includes a rotatable insert 102 and an outer ring 120. The rotatable insert 102 can have a molded body 104 with an outer surface 106 and an electrical face 112 that can connect to a photoelectric device 10, like a photocell, for example, via electrical sockets 108 in body 104 that are open at the electrical face 112, wherein the sockets 108 are connected to wiring 115. An actuating slot 110 can be provided at the electrical face 112 of the insert 102. The actuating slot 110 is sized to receive a tool for rotating the insert 102 with respect to the outer ring 120. The slot 110 can be positioned generally in the center of the electrical face 112. The body 104 of the insert 102 has a mounting face 116 (FIG. 2) that is opposite the electrical face 112. The mounting face 116 is designed to mount on a housing 22 (also referred to as a housing wall), as seen in FIG. 1 of the luminaire 20, for example.

The rotatable insert 102 is received in the outer ring 120 such that an inner surface 126 of the outer ring 120 surrounds a portion of the outer surface 106 of the insert 102, as seen in FIGS. 5A and 5B. The outer ring 120 is configured to fit around the rotatable insert 102. The outer ring 120 has a mounting surface 122 configured to mount to the housing 22. A gasket 130 can be provided between the mounting surface 122 and the housing 22. The outer ring 120 may have mounting bores 128 that receive fasteners for securing the receptacle 100 to the housing 22. The fasteners, such as screws, can extend through the bores 128, through the gasket 130, and through the housing wall 22.

The insert 102 is configured to be rotatable with respect to the outer ring 120 to be able to orient the insert 102 in a desired direction, such as for optimal positioning of the photoelectric device for optimal photocell efficiency and operation. The receptacle 100 is oriented in the desired direction when the electrical sockets 108 thereof, which receive mating contact prongs or pins of the photoelectric 10, are properly oriented, such that the photoelectric device 10 is optimally positioned when the pins thereof are inserted into the sockets 108. The electrical face 112 of the insert 102 can have indicia 114 for indicating the desired direction of the receptacle 100 and proper orientation of the sockets 108. The indicia 114 can be any symbol, lettering, or text to indicate direction, such as an arrow, the letter "N" or the word "North", or a combination thereof, as seen in FIG. 1.

The outer ring 120 and the rotatable insert 102 have corresponding engagement features that allow the insert 102 to rotate with respect to the outer ring 120, and allows the outer ring 120 to move axially with respect to the insert 102, as seen in FIGS. 3, 4A, 4B, and 5A-5C. In an example, the corresponding engagement features can one more alignment keys 140 that fit into a groove 142. The alignment key 140 can be positioned on the annular inner surface 126 of the outer ring 120, as best seen in FIGS. 5A-5C. The groove 142 can be an annular groove formed in the outer surface 106 of the body 104 of the insert 102, as best seen in FIGS. 3 and 5C. The body 110 of the rotatable insert 102 includes at least one key entrance 144 (FIG. 4C) disposed in the outer surface 106 thereof that is in communication with the annular groove 142. The key entrance 144 can be a recess or slot that is sized to receive the inwardly extending alignment key 140 of the outer ring 120.

Figure 7D:
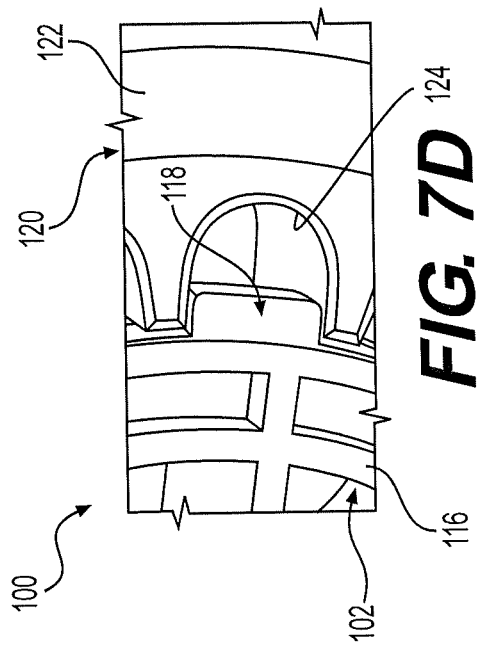
FIG. 7D is an enlarged partial view of the bottom of the receptacle illustrated in FIG. 7B.
Figure 7C:
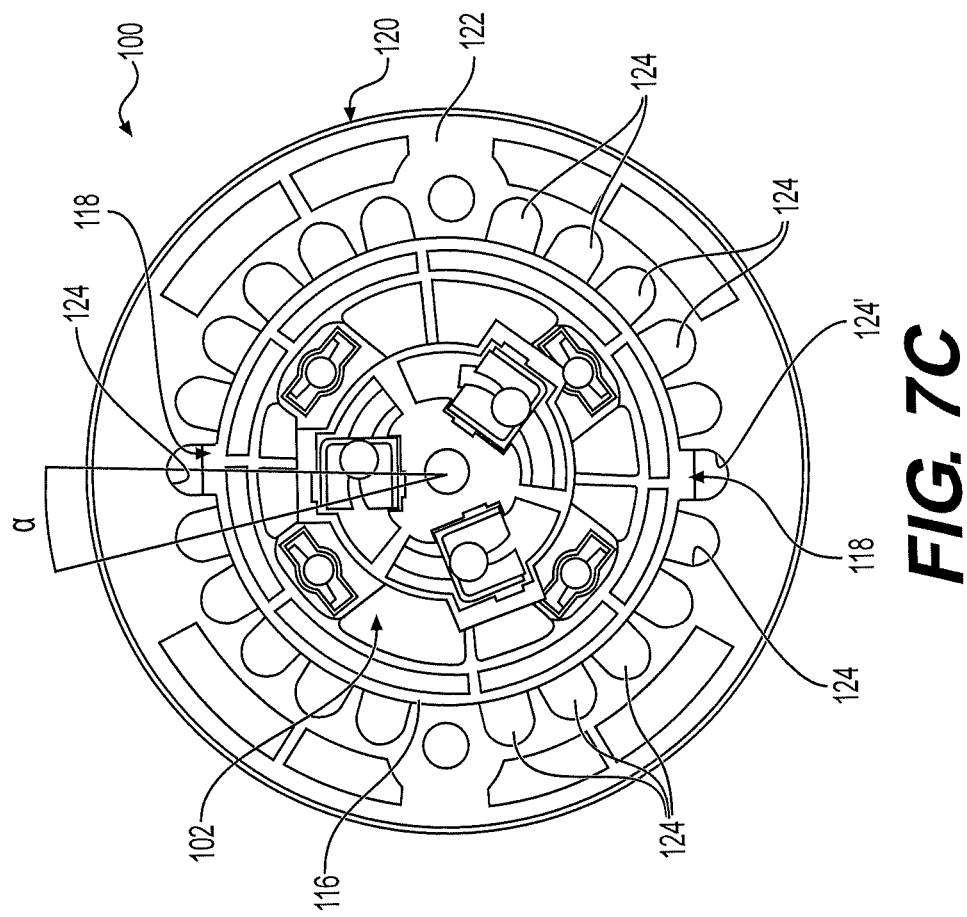
FIG. 7C is a bottom plan view of the receptacle illustrated in FIG. 7B.

As seen in FIGS. 7A-7D, the outer ring 120 and the insert 102 have corresponding interlocking features, such as one or more locating holes 124 and at least one locating key 118, configured to fix the insert 102 in the desired direction for proper positioning of the photoelectric device 10 to be plugged therein. In an example, the one or more locating holes 124 can be disposed in the mounting surface 122 of the outer ring 120, and the at least one locating key 118 can be located on the outer surface 106 of the insert 102, as best seen in FIGS. 3, 7B and 7D. The locating holes 124 can be arranged annularly and spaced apart on the mounting surface 122 of the outer ring 120. The locating holes 124 can be arranged at select intervals in accordance with the positioning of the holes 124, the spacing between the holes 124, the size of the holes 124, and or the number of holes 124. That is, the locating holes 124 can be arranged on the outer ring 120 such that the holes 124 are at cx intervals, as seen in FIG. 6d. Any number of holes 124 can be used and the a interval can be any angle. In an example, a is about 15 to 20 degrees such that the holes 124 are at 15 to 20 degree intervals, thereby allowing selection of the desired direction of the receptacle 100 at 15 to 20 degree intervals. The holes 124 could be at other intervals, that is the a interval could be greater than 20 degrees or smaller than 15 degrees, for example. In some examples, the a intervals vary (e.g., the holes 124 may be at 15 degree intervals for one portion of the radius of the outer ring 120 and at a different a interval (e.g., 10 degrees for another portion of the radius of the outer ring 120).

The present disclosure provides methods of assembling and mounting the receptacle 100. To assemble and mount the receptacle 100 to the luminaire housing 22, the outer ring 120 and the insert 102 are coupled together. The outer ring 120 is coupled with the insert 102 such that the insert 102 freely rotates with respect to the outer ring 120 and such that the outer ring 120 and the insert 102 are axially movable with respect to one another. To do so, the engagement feature of the outer ring 120, that is the alignment key 140, is aligned with the key entrance 144 of the engagement feature of the insert 102, that is the annular groove 122. The key entrance 144 is sized such that when aligned, the alignment key 140 can be received in the key entrance 144. In an example, the key entrance 144 is sized to receive the alignment key 140 in a clearance fit, as seen in FIG. 4C, so that there is space between the alignment key 140 and the key entrance 144. Alternatively, the key entrance 144' can be sized to receive the alignment key 140' in an interference or tight fit, as seen in FIG. 4D, such that so that the outer ring 120 is engaged with the insert 102 via a friction fit. Once the alignment key 140 of the outer ring 120 is inserted into the entrance 144 of the insert 102, the outer ring 102 can then be moved axially with respect to the insert 102 (in the direction of the mounting face 116 of the insert 102) until the alignment key 140 reaches the annular groove 142, as seen in FIG. 5A. The locating key 118 on the outer surface 106 of the body 110 of the insert 102 remains exposed, as seen in FIG. 5D, that is the locating key 118 is not covered by the outer ring 120 when the outer ring 120 is moved axially along the insert 102.

Next, the receptacle 100 is mounted on the housing 22 by inserting the a portion of the body 110 of the insert 102 into an opening 24 in the housing wall 22, as seen in FIGS. 2 and 6A. The gasket 130 can be positioned at and around the opening 24 so that the gasket 130 is located between the receptacle 100 and the housing wall 22. The insert 102 can then be rotated with respect to the outer ring 120 to orient the receptacle 100 in the desired direction, as seen in FIGS. 6A-6C. To do so, a tool is inserted into the actuating slot 110 of the insert 102 to rotate the insert 102 with respect to the outer ring 120 in either a clockwise or counter-clockwise direction. When the rotating the insert 102, the alignment key 140 of the outer ring 120 is received in and slides along the annular groove 142 of the insert 102. The installer can use the indicia 114 on the electrical face 112 of the receptacle 100 to assist with proper positioning of the receptacle 100 in the desired direction.

After rotating and orienting the insert in the desired direction, the outer ring 120 and the insert 102 can be interlocked, via their corresponding interlocking features, to fix the rotatable insert in place in the desired direction. The locating key 118 of the insert 102 is received in one of the locating holes 124 in the outer ring 120 as the outer ring 120 is moved axially toward the housing 22, as best seen in FIGS. 7B and 7D. The arrangement of the holes 124 at allows positioning of the receptacle 100 towards at a intervals, such as 15 degree intervals to cover 360 degrees. The outer ring 120 continues to move axially toward the housing wall 22 until the mounting surface 122 of the outer ring abuts the gasket 130 that is on the housing 22, as seen in FIG. 7A. Fasteners can then be inserted through the mounting bores 128 of the outer ring 120, through the gasket 130 and through the housing wall 22. This secures the receptacle 100 to the housing 22 of the luminaire 20. As seen in FIGS.

12A and 12B, the gasket 130 under the outer ring 120 provides the receptacle 100 with a compression stop which prevents overtightening and yielding of the gasket 130.

The rotational orientation of the receptacle 100 can be easily adjusted at any time by lifting the receptacle 100 at its outer ring 120, rotating the insert 102 to the desired direction, and moving the outer ring 120 back towards the housing 22 to interlock the outer ring 120 and the insert 102 and fix the position of the receptacle 100.

Figure 8:
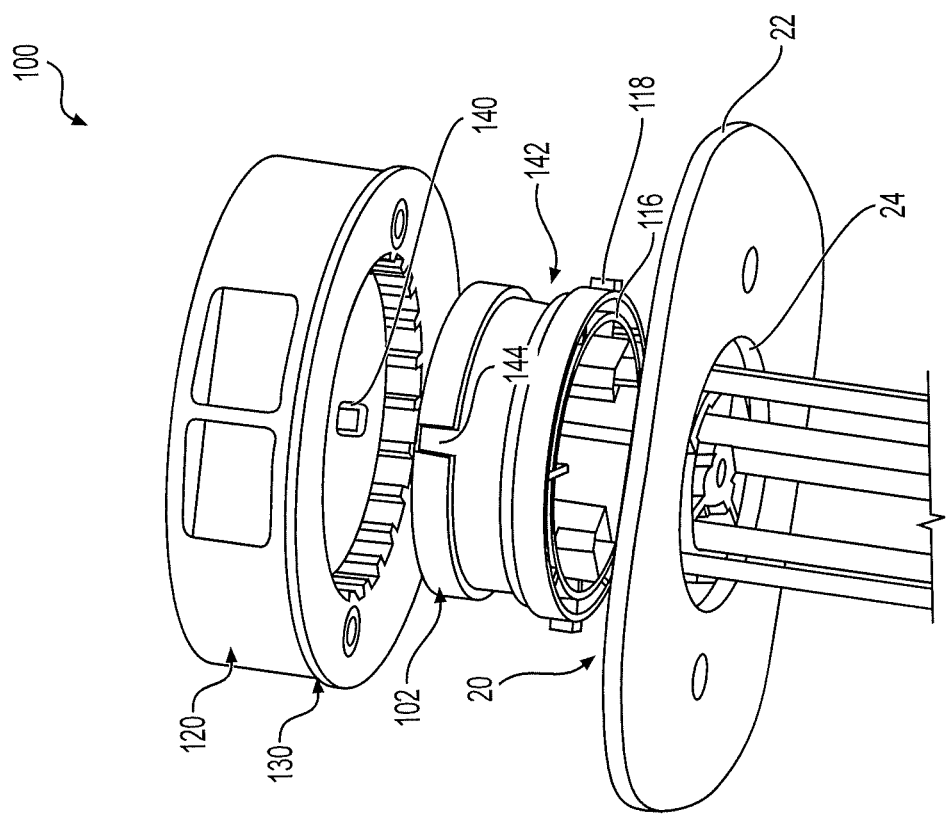
FIG. 8 is an exploded perspective view of a rotatable receptacle, according to another example of the present disclosure.
Figure 11B:
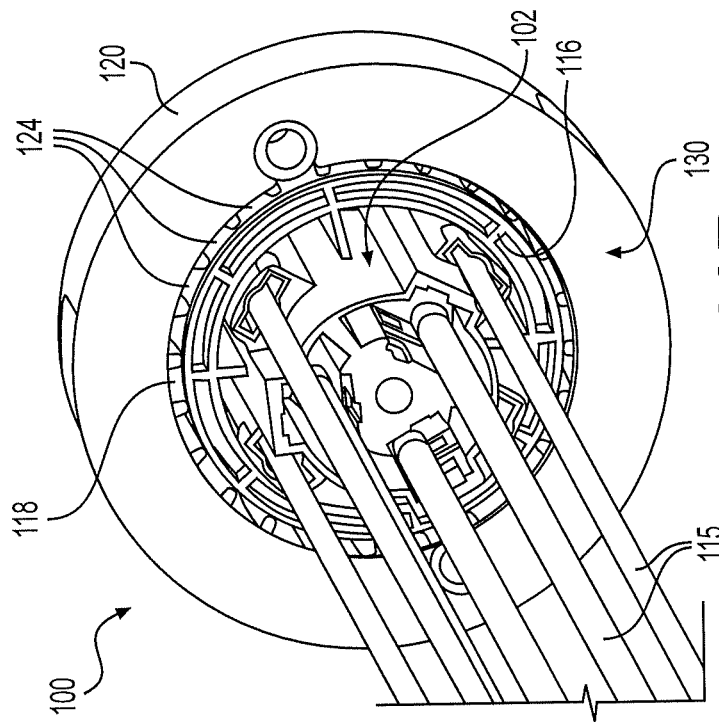
FIG. 11B is a bottom perspective view of the receptacle illustrated in FIG. 11A with the housing removed.
Figure 11A:
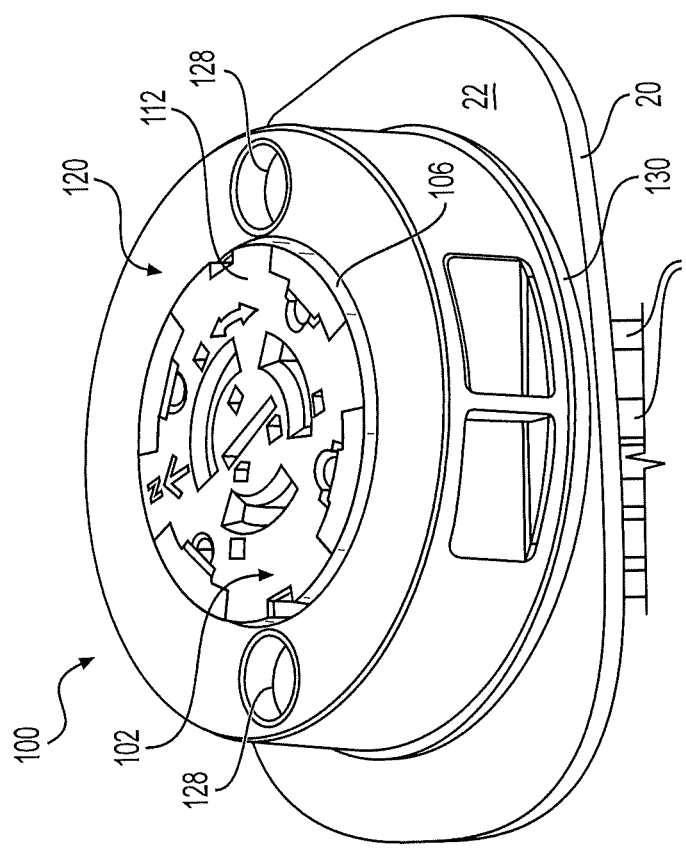
FIG. 11A is a top perspective view of the receptacle illustrated in FIG. 8, showing the receptacle assembled and mounted to the housing of a luminaire.

In another example of a method of assembling and mounting the receptacle 100, the gasket 130 can be placed on the mounting surface 122 of the outer ring 120 prior to doing anything else. As seen in FIGS. 8 and 9A, the gasket 130 is disposed on the mounting surface 122 of the outer ring 120 and not on the housing wall 22, as in the example above. The remaining steps for assembling and mounting the receptacle 100 are the same as those described above, except that the gasket 130 is already on the mounting surface 122 of the outer ring 120. That is the outer ring 120 with the gasket 130 therein is aligned and coupled with the insert 102 such that the insert 102 freely rotates with respect to the outer ring. As seen in FIG. 9B, the locating key 118 of the insert 102 remains exposed even with the gasket on the mounting surface 122 of the outer ring 120. The insert 102 can then be rotated to the desired orientation and direction, as seen in FIGS. 10A and 10B. The outer ring 120 with the gasket 130 on its mounting surface 122, can then be moved axially with respect to the insert 120 such that the locating pin 118 of the inert 102 interlocks with one of the locating holes 124 of the outer ring 120 and the gasket abuts the housing 22. Fasteners can then be inserted through the receptacle 100 and the gasket 130 to secure the receptacle to the housing 22.

Luminaries can be provided with the electrical receptacle 100 for mating with the photoelectric device 10, such as a photoelectric controller or photocell, such that the photoelectric device 10 is mounted with the luminaire 20. The receptacle 100 can be electrically wired into the power supply of the luminaire 20 via wiring 115. The photoelectric device 10 can be plugged into the receptacle 100 at the electrical face 112 to provide photoelectric control of the luminaire 20. The photoelectric device 10 has a number of prongs which are inserted into the corresponding sockets 108 in the receptacle 100 by applying insertion pressure on the device 10. After the prongs are completely inserted in the sockets 108, the photoelectric device 10 can then be rotated, via the rotatable insert 102, to the optimal position.

After insertion into the receptacle 100, the photoelectric device 10 can be orientated in a desired direction, such as a northerly direction (in the northern hemisphere and a southerly direction in the southern hemisphere) by using the indicia 114, such as the letter "N", the word "North", an arrow pointing North, or the like, on the electrical face 112 of the rotatable insert 102 to optimize the operation of the photoelectric cell of the device 10. This can be done while the receptacle 100 remains mounted to the luminaire's housing 22. The position of the photoelectric device 10 can then be fixed in place by interlocking the outer ring 120 and the insert 102 of the receptacle 100.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. A rotatable receptacle, comprising:
an outer ring having a mounting surface for mounting to a housing, wherein the outer ring is configured to be rotationally fixed in orientation relative to the housing and selectively moveably vertically relative to the housing when mounted thereto; and
a rotatable insert received in the outer ring such that an inner surface of the outer ring surrounds an outer surface of the rotatable insert, the rotatable insert having an electrical face configured to mate with a photoelectric device and an opposite mounting face for mounting to the housing, and the rotatable insert being rotatable with respect to the outer ring to orient the rotatable insert in a desired direction for optimal positioning of the photoelectric device,
wherein the outer ring and the rotatable insert have corresponding interlocking features configured to fix the rotatable insert in the desired direction, and
wherein the rotatable insert is rotatable relative to the outer ring by lifting the outer ring vertically from the mounting surface and rotating the rotatable insert.

2. The receptacle of claim 1, wherein the interlocking feature of the outer ring includes one or more locating holes formed in the mounting surface of the outer ring, and the interlocking feature of the rotatable insert includes at least one locating key on the outer surface of the rotatable insert sized to engage one of the locating holes of the outer ring.

3. The receptacle of claim 2, wherein the locating holes are arranged annularly and spaced apart on the outer ring.

4. The receptacle of claim 3, wherein the locating holes are arranged at intervals that are about 15 degrees apart.

5. The receptacle of claim 1, wherein the rotatable insert and the outer ring are rotatably engaged with one another via corresponding engagement features formed on the inner surface of the outer ring and the outer surface of the rotatable insert, respectively, the engagement features include an alignment key formed on the inner surface of the outer ring that is receivable in a respective annular groove formed on the outer surface of the rotatable insert.

6. The receptacle of claim 1, wherein the electrical face of the rotatable insert includes indicia that indicates the desired direction for optimal positioning of the photoelectric device.

7. The receptacle of claim 6, wherein the indicia is the letter N or the word North.

8. The receptacle of claim 1, further comprising a gasket is arranged at the mounting surface of the outer ring.

9. A rotatable receptacle, comprising:
an outer ring having a mounting surface for mounting to a housing, wherein the outer ring is configured to be rotationally fixed in orientation relative to the housing and selectively moveably vertically relative to the housing when mounted thereto; and
a rotatable insert received in the outer ring such that an inner surface of the outer ring surrounds an outer surface of the rotatable insert, and the rotatable insert having an electrical face configured to mate with a photoelectric device and an opposite mounting face for mounting to the housing, and the rotatable insert being rotatable with respect to the outer ring to orient the rotatable insert in a desired direction for optimal positioning of the photoelectric device,
wherein the outer ring and the rotatable insert have corresponding engagement features that allow the rotatable insert to rotate with respect to the outer ring,
wherein the outer ring and the rotatable insert have corresponding interlocking features configured to fix the rotatable insert in the desired direction, and
wherein the rotatable insert is rotatable relative to the outer ring by lifting the outer ring vertically from the mounting surface and rotating the rotatable insert.

10. The receptacle of claim 9, wherein the rotatable engagement feature of the rotatable insert is an annular groove formed in the outer surface of the rotatable insert.

11. The receptacle of claim 10, wherein the rotatable engagement feature of the outer ring is an inwardly extending alignment key on the inner surface of the outer ring that is receivable in the annular groove of the rotatable insert.

12. The receptacle of claim 11, wherein the annular groove of the rotatable insert includes at least one key entrance that is open at the electrical face of the rotatable insert and sized to receive the alignment key of the outer ring.

13. The receptacle of claim 9, wherein the interlocking feature of the outer ring includes one or more locating holes formed in the mounting surface of the outer ring, and the interlocking feature of the rotatable insert includes at least one locating key on the outer surface of the rotatable insert sized to engage one of the locating holes of the outer ring.

14. The receptacle of claim 9, wherein the electrical face of the rotatable insert includes direction indicia.

15. The receptacle of claim 9, wherein the outer ring includes at least one bore for receiving a fastener for securing the outer ring to the housing.

16. The receptacle of claim 15, further comprising a gasket is arranged between the outer ring and the housing.

17. A method of mounting a photoelectric receptacle to a luminaire, the photoelectric receptacle including an outer ring and a rotatable insert with an electrical face configured to mate with a photoelectric device, the method comprising the steps of:

coupling the outer ring with the rotatable insert such that the rotatable insert freely rotates with respect to the outer ring and such that the outer ring and the rotatable insert are axially movable with respect to one another;
after rotatably coupling the outer ring and the rotatable insert, lifting the outer ring axially and rotating the rotatable insert to orient the rotatable insert in a desired direction for optimal positioning of the photoelectric device; and
after orienting the rotatable insert, lowering the outer ring axially and interlocking the outer ring and the rotatable insert to fix the rotatable insert in place in the desired direction.

18. The method of claim 17, further comprising the step of aligning the outer ring with respect to the rotatable insert before rotatably coupling the outer ring with the rotatable insert.

19. The method of claim 18, wherein the step of aligning the outer ring with respect to the rotatable insert includes aligning an alignment key of the outer ring with a key entrance of the rotatable insert and pressing the outer ring to move the outer ring axially with respect to the rotatable insert to engage the alignment key with the key entrance.

20. The method of claim 19, wherein the alignment key and the key entrance are engaged in a clearance fit.

21. The method of claim 19, wherein the alignment key and the key entrance are engaged in an interference fit.

22. The method of claim 17, wherein the step of rotatably coupling the outer ring with the rotatable insert includes engaging an alignment key on the inner surface of the outer ring with an annular groove on the outer surface of the rotatable insert.

23. The method of claim 17, wherein the step of orienting the rotatable insert includes rotating the rotatable insert at intervals of about 15 degrees.

24. The method of claim 17, wherein the step of interlocking the outer ring and the rotatable insert includes fitting at least one locating key on an outer surface of the rotatable insert with one of a plurality of locating holes on the outer ring.

25. The method of claim 24, wherein the locating key is exposed prior to the step of interlocking the outer ring with the rotatable insert.

26. The method of claim 17, further comprising the step of mounting the interlocked outer ring and rotatable insert to the housing and securing the outer ring to the housing.

27. The method of claim 26, further comprising the step of placing a gasket on the housing prior to mounting the interlocked outer ring and rotatable insert to the housing and compressing the gasket between the outer ring and the housing.

28. The method of claim 26, further comprising the step of placing a gasket on a mounting surface of the outer ring prior to mounting the interlocked outer ring and rotatable insert to the housing and compressing the gasket between the outer ring and the housing.

* * * * *